3,398,013
PREPARATION OF FILMS OF BORON CARBIDE
Jerome J. Krochmal, 1641 Layton Drive, Dayton, Ohio 45406; Isadore Shapiro, Los Angeles, Calif. (525 E. Alondra Blvd., Gardena, Calif. 90247); and Charles T. Lynch, 387 Cherrywood, Fairborn, Ohio 45324
Filed July 2, 1965, Ser. No. 469,279
6 Claims. (Cl. 117—106)

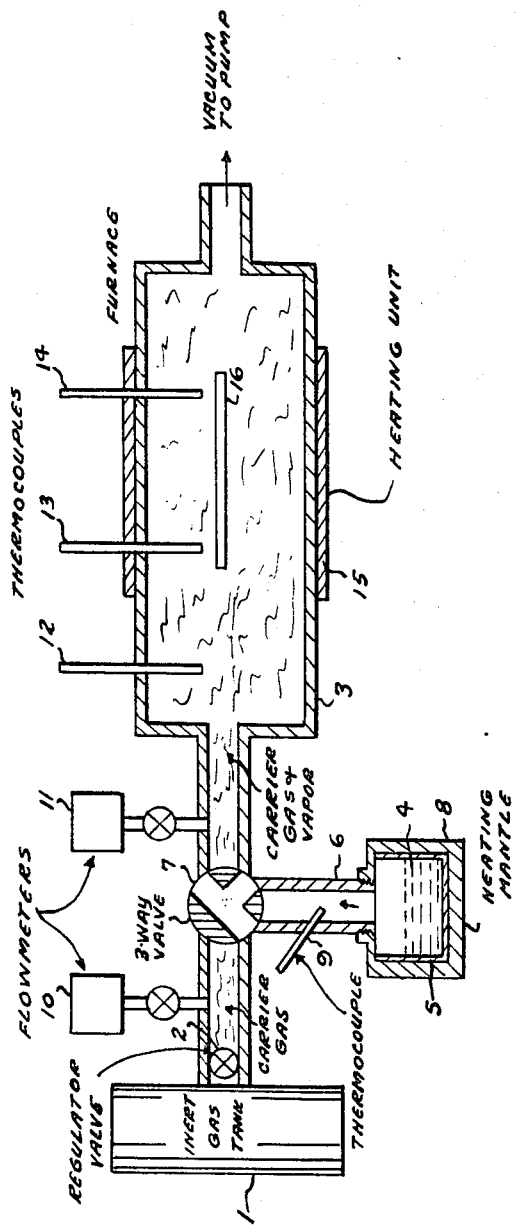

ABSTRACT OF THE DISCLOSURE

A method of forming a layer of $B_4C$ on a substrate, such as a flat surface or a filament, by introducing an inert carrier gas and a carborane into a chamber containing the substrate and heating said carborane at a temperature ranging from 400° C.–1000° C. to effect decomposition of the carborane into $B_4C$ which is deposited on said substrate. Where the carborane is a solid, it is preliminarily vaporized at a low pressure of 1.6 mm. of mercury and less before being introduced into the chamber or furnace.

---

The invention that is described herein may be manufactured and used by or for the Government for governmental purposes without the payment to the inventors of any royalty thereon.

This invention relates to the preparation of thin films, fine filaments, whiskers or fibers, and coatings of boron carbide as decomposition products of selected carboranes.

The carboranes are a unique class of compounds, prepared generally, directly or indirectly, by the reaction of boron hydrides with acetylene or its derivatives, and are characterized by the absence of bridge hydrogens in the boron skeleton. The unique high stability of the carboranes is attributed to the inclusion of two carbon atoms into the structure of the boron network. The two extra electrons furnished by the carbon atoms stabilize the electron deficient boron structure. The generic formula for the carboranes is $B_nC_2H_{n+2}$ where $n$ is an integer of value 3 or larger. Organic derivatives of carboranes are well known and are prepared either by introducing the organic derivatives into either parent, boron hydrides or acetylene. For example, if $RC\equiv CR'$ is reacted with decaborane, the resulting carborane will have the formula $RR'B_{10}C_2H_{10}$.

Under some conditions the reaction of boron hydrides and acetylene lead to another series of organoboron compounds, such as are exemplified by $B_4C_2H_8$, which is termed "dihydrocarborane-4." Alkyl derivatives of this compound also have been prepared.

In this invention the thermal decomposition of carboranes will result in the formation of boron carbide $B_4C$, or more properly $B_{12}C_3$. In the case of carborane-10 ($B_{10}C_2H_{12}$) its structure is pictured as the replacement of the four bridge hydrogens of decaborane by the two carbon atoms of acetylene, thus completing the icosahedral structure. In boron carbide the $B_{12}$ unit is the icosahedron unit, held together by the linear $C_3$ unit. The great similarity between carborane-10 and boron carbide leaves no question but that the decomposition of carborane-10 will result in formation of boron carbide. Likewise, organo derivatives of carboranes, viz $RR'B_{10}C_2H_{10}$, will behave similarly, and provide a ready means of varying the boron to carbon ratio in the compound.

In this invention R, R' is defined to include substituted groups such as alkyl, alkene, aryl, halogen, and the like. Substitution may be for one or both of the R, R' groups. Simple examples of substituted carboranes which can be used are vinyl carborane-10 ($CH_2=CHCB_{10}H_{10}CH$), methyl carborane-10 ($CH_3CB_{10}H_{10}CH$), and propyl bromo carborane-10 ($H_7C_3CB_{10}H_{10}CBr$). Further information on these compounds appears in Chemical and Engineering News, vol. 41 (49), pp. 62–70 (1963); Inorganic Chemistry, vol. 2, pp. 1089 to 1128, 1317 (1963); Journal of the American Chemical Society, vol. 84, p. 3837 (1962); Journal American Chemical Society, vol. 85, p. 3167 (1963); and later publications on the subject.

The process that is disclosed herein is used in the production of films, filaments of a desired degree of fineness, such as whiskers, coarse fibers, platelets, films, coatings on substrates and the like.

The films that are produced can be used in making wear-resistant applications such as gage blocks, dies, seals, bearings, valve seats, and the like. The fine filaments can be used as reinforcements in composite materials wherein the matrices are metallic, ceramic, or plastic in nature.

The coated filaments, in slightly modified applications, illustratively involve films or filaments of other materials, on substrate surfaces that are metallic, ceramic, plastic, or the like. The starting materials are illustrated by any carborane or any carborane derivative; as well as substitutional compounds that meet the requirement that the carborane derivative can be thermally decomposed to $B_4C$, and that a technique of getting the material into the vapor phase is feasible.

The process that is here of interest is a simple, single-step decomposition reaction that produces a boron carbide. The chosen process permits precise control of the reaction and of the chemistry of the products that are formed. Other techniques may involve more complicated reactions which are more difficult to control in a reproducible manner, without departing from the present invention.

The carboranes that are employed as the starting materials in the decomposition reactions here of interest, are converted to their vapor phases and then are caused to form solid boron carbide as fine filaments, whiskers, fibers, thin films, or the like.

Variations in the stoichiometry in the broad region where boron carbide exists as a single phase, nominally from 9.5 to 19.9 atomic percent carbon, is achieved by varying the specific carborane chosen as the starting material or class of suitable carborane, or substituted carborane. In a similar manner, two-phase deposits of boron carbide plus boron, or boron carbide plus graphite, may be produced. $B_4C$ actually exists as a single phase compound with a broad range of variation in stoichiometry. The structural unit is $B_{12}C_3$ when all carbon sites are filled and $B_{12}C_{1.2}$ when a maximum of carbon sites are empty while the "boron carbide" remains in the same phase. Using the smallest whole number ratios $B_{12}C_3$ is $B_4C$ and $B_{12}C_{1.2}$ is $B_4C_{0.4}$.

The working apparatus that is used in the process that is disclosed herein is in common use in chemical laboratories. The working apparatus comprises an inert gas tank 1 that is connected through a first regulator valve 2 into one end of a resistance-heated tube furnace 3. The inert gas serves as a carrier gas as it picks up the reactant vapor above a liquid (or solid) 4 within a flask 5 and conducts the reactant vapor thru a three-way control valve 7 into the intake end of the furnace 3.

An electrically heated mantle 8 maintains the liquid or solid in the flask 5 at a temperature suitable for the desired vapor production, as indicated by a thermocouple 9, or the like. Separate flow meters 10 and 11 indicate the rate of flow of the inert gas emitted from the gas tank 1, as distinct from the flow of the carrier gas and vapor mixture that arrives at the input end of the furnace 3.

The furnace 3 is provided with suitable temperature indicators such as a first thermocouple 12 with its hot junction positioned within the gas flow at the input end of the furnace, and a pair of thermocouples 13 and 14 that are separately positioned such that their hot junctions are at the opposite ends of the hot zone of the furnace. The temperature of the furnace is maintained by control over the furnace heating mantle 15. Where desired, a substrate 16 is positioned within the furnace 3. Alternatively, the substrate itself may be inductively or resistively heated to the desired deposition temperature. The effluent gas mixture is passed out of the furnace to a vacuum pump for a desired disposition, such as for recovery or as waste.

Some of the compounds that serve as starting materials in the process described herein are gases under laboratory conditions of temperature and pressure of 25° C. and one atmosphere of pressure, and are fed directly into the intake end of the furnace. Other starting materials under laboratory conditions of temperature and pressure are liquids or are solids. These liquid or solid starting materials are vaporized without contamination, deterioration, or extensive decomposition, and their vapors are mixed with a suitable carrier gas, as they are introduced into the input end of the furnace.

Examples of suitable carborane starting materials that are mixed with carrier gas and introduced into the input end of the furnace under laboratory conditions of temperature and pressure, have the composition as gases of $H_2C_2B_3H_3$ and $H_2C_2B_4H_4$; and as liquids have the compositions $H_2C_2B_5H_5$ and $H_2C_2B_8H_8$, respectively.

Illustrative starting materials that are solids at 25° C. and one atmosphere of pressure and, hence, that must be vaporized under a reduced pressure or a partial vacuum without extensive decomposition, have the compositions: $CH_3COOCH_2$—$CB_{10}H_{10}CH$ with a boiling point of 82–84° C., at the pressure of 0.2 mm. Hg;

$$H_7C_3\text{—}CB_{10}H_{10}CBr$$

with a boiling point of 107° C. at the pressure of 1 mm. of mercury; $H_9C_4CB_{10}H_{10}CBr$ with a boiling point of 85–90° C. at the pressure of 0.5 mm. of mercury; $CH_3COO(CH_2)CH_2$—$CB_{10}H_{10}CH$ with a boiling point of 146° C. at the pressure of 1.6 mm. of mercury; and $CH_3(CH_3COO)CH$—$CB_{10}H_{10}CH$ with a boiling point of 85–95° C. at the pressure of 0.2 mm. of mercury. Compounds of these types can be used singly or in mixtures to vary the B to C ratio desired in the final deposited product. Other compounds can be used as vapor mixtures with the carboranes as another method of achieving any desired B to C ratio in the deposited composition. Compounds such as $BH_3$ or other borohydrides and $CH_4$ or other hydrocarbons increase the amount of deposited boron and carbon respectively in the boron carbide product. It is also practical to use $BCl_3$ and other boron halides to supply the additional boron.

The reactions here of interest are one step thermal decompositions from the carborane derivative in the vapor phase to the boron carbide in the solid phase on the substrate. The furnace is maintained at a temperature high enough to prevent condensation of the vapor in the intermediate vapor conducting apparatus. Room temperature is appropriate for compounds that are gases at room temperature, such illustratively as $B_3C_2H_5$. The furnace hot zone is maintained at a temperature of from 400–1000° C., depending on the lowest temperature in which the chosen material decomposition to boron carbide is effected. Temperatures up to about 2000° C. can be used if it is desired that the boron carbide product or composite be further sintered. Where vapor concentrations of 100 percent are used no carrier gas is present.

For the deposition of whiskers, the concentration of 1 percent, or less, of the carborane derivative is best. Whisker growth is slow but it can be controlled. At higher concentrations, whiskers are found in very low yields on the edges of the hot zone. Thin films are laid down with concentrations generally of from 10% in an inert carrier gas to 100% of the vapor to be deposited. The rate of film growth is controlled by the absolute amount of carborane derivative that is introduced into the furnace.

The process can be used to produce coarse fibers and platelets as well as films and whiskers in the form of fine filaments. The list of starting materials can include any carborane derivative. There are numerous substantial possibilities. The requirements are only that, during the process, the carborane derivative is thermally decomposed to boron carbide, and that the technique used of getting the material into the vapor phase is feasible.

1ST EXAMPLE

Under laboratory conditions of temperature and pressure and in desired molal proportions, the tricarborane $H_2C_2B_3H_3$ in its gaseous phase, is fed into the interior of the flask neck 6 from which it passes through the valve 7 into the furnace 3 with the carrier gas argon or helium from the tank 1. The hot zone of the furnace 3 is maintained at the lowest temperature at which the $H_2C_2B_2H_3$ vapor is decomposed to boron carbide plus carbon which is deposited on the surface of the substrate 16. The potential applied to the heating mantle 15 illustratively, is such that the furnace 3 is maintained within the preferred range of about 600 to 800° C.

2ND EXAMPLE

The carborane of the formula $H_2C_2B_{10}H_{10}$ is a solid under laboratory conditions of temperature and pressure. It can be sublimed at temperatures of 250 to 350° C. The process accomplishing the decomposition of the $H_2C_2B_{10}H_{10}$ accompanied by the deposition of boron carbide on the substrate 16, is started by the positioning of the $H_2C_2B_{10}H_{10}$ within the flask 5. The heating mantle 8 is then energized to vaporize the contents of the flask 5 and the argon or helium from the tank 1 is caused to mingle with the vapor from the flask 5 and to conduct that vapor into the furnace 3. The furnace heating mantle 15 is then energized to adjust the furnace temperature between 600° C. and 800° C., at which the decomposition of the $H_2C_2B_{10}H_{10}$ to boron carbide occurs. The boron carbide is caused to deposit as a surface coating on the substrate 16 and the residual gas and vapor passes out of the furnace 3. In the same manner, the substrate 16 in the furnace 3 may take the form of a tungsten or other suitable filament that is drawn continuosly through the furnace 3 where the boron carbide is deposited as a coating on the surface of the filament. The carborane vapor can also act as its own carrier gas in this process.

It is to be understood that the materials and the process steps that are disclosed herein are submitted as being illustrative of a successfully operative embodiment of the present invention and that limited modifications may be made therein without departing from the spirit and the scope of the present invention.

We claim:
1. A process for depositing boron carbide $B_4C$ on a substrate comprising the steps of (1) introducing an inert carrier gas and a carborane of the structure $B_nC_2H_{n+2}$ where $n$ is an integer having a value of 3 to 8 into a chamber containing the substrate, and (2) heating said carborane at the lowest temperature in the range of 400–1000° C. to effect a decomposition of the carborane into $B_4C$ which is deposited on said substrate.

2. The process of claim 1 in which the carborane is $B_4C_2H_6$.

3. The process of claim 1 in which the carborane is $B_3C_2H_5$.

4. The process of claim 1 in which the carborane is $B_5C_2H_7$.

5. The process of claim 1 in which the carborane is $B_8C_2H_{10}$.

6. A process for depositing boron carbide $B_4C$ on a substrate comprising the steps of (1) vaporizing a carborane of the structure $$RCB_{10}H_{10}R'$$

where R' is a member selected from the group consisting of H— and Br— and R is a member selected from the group consisting of H—, $CH_2=CH-$, $CH_3-$, $$CH_3COOCH_2-C_3H_7-$$

$C_4H_9-$, $CH_3COO(CH_2)_2-$, and $(CH_3)_2COOCH-$ under a pressure of 1.6 mm. of mercury and less (2) introducing said carborane and an inert carrier gas into a chamber containing the substrate, and (3) heating said carborane at the lowest temperature in the range of 400–1000° C. to effect a decomposition of the carborane into $B_4C$ which is deposited on said substrate.

References Cited

UNITED STATES PATENTS 3,334,967   8/1967   Bourdeau _____ 23—208

OTHER REFERENCES

Chemical and Engineering News, Dec. 9, 1963, pp. 62 to 70 relied upon.

ALFRED L. LEAVITT, *Primary Examiner.*

A. GOLIAN, *Assistant Examiner.*